United States Patent
Joveski et al.

(10) Patent No.: US 11,151,525 B2
(45) Date of Patent: Oct. 19, 2021

(54) SYSTEMS AND METHODS FOR WITHDRAWAL CONSOLIDATION

(71) Applicant: Coinbase, Inc., San Francisco, CA (US)

(72) Inventors: Bojan Joveski, San Francisco, CA (US); Paul Collier, San Francisco, CA (US); Maksim Stepanenko, San Francisco, CA (US); Justin O'Brien, San Francisco, CA (US); Vipul Patil, San Francisco, CA (US); Sahil Amoli, San Francisco, CA (US)

(73) Assignee: Coinbase, Inc., San Francisco, CA (US)

( * ) Notice: Subject to any disclaimer, the term of this patent is extended or adjusted under 35 U.S.C. 154(b) by 24 days.

(21) Appl. No.: 16/810,677

(22) Filed: Mar. 5, 2020

(65) Prior Publication Data
US 2020/0286047 A1    Sep. 10, 2020

Related U.S. Application Data

(60) Provisional application No. 62/814,194, filed on Mar. 5, 2019, provisional application No. 62/836,259, filed on Apr. 19, 2019.

(51) Int. Cl.
*G06Q 20/00* (2012.01)
*G06Q 20/06* (2012.01)
(Continued)

(52) U.S. Cl.
CPC ....... *G06Q 20/065* (2013.01); *G06Q 20/3825* (2013.01); *G06Q 20/3829* (2013.01);
(Continued)

(58) Field of Classification Search
None
See application file for complete search history.

(56) References Cited

U.S. PATENT DOCUMENTS 10,269,009 B1 *   4/2019   Winklevoss ........... G06Q 20/36
2015/0324789 A1 *  11/2015   Dvorak .............. G06Q 20/3274
                                                        705/67

(Continued)

OTHER PUBLICATIONS

"An analysis of batching in Bitcoin", Coin Metrics team, May 20, 2018, https://coinmetrics.io/batching/.
(Continued)

*Primary Examiner* — William J Jacob
(74) *Attorney, Agent, or Firm* — Banner & Witcoff, Ltd.

(57) ABSTRACT

Systems and methods for performing consolidation of several cryptocurrency payments by using a non-custodial cryptocurrency platform. A consolidation address is generated at the non-custodial platform in response to a withdrawal request. The consolidation address is under direct ownership of a user. At least one unsigned consolidation transaction is generated that identifies at least one selected payment representation as input, and the generated consolidation address as an output. An unsigned destination transaction is also generated. The unsigned destination transaction identifies the generated consolidation address as an input and the withdrawal destination as an output. A signed version of each consolidation transaction and a signed version of the destination transaction are received from a signing enclave. The signing enclave is included in a client device of the user.

17 Claims, 9 Drawing Sheets

(51) Int. Cl.
*G06Q 20/38* (2012.01)
*H04L 9/32* (2006.01)
*G06Q 20/40* (2012.01)

(52) U.S. Cl.
CPC ......... *G06Q 20/401* (2013.01); *H04L 9/3247* (2013.01); *H04L 9/3263* (2013.01); *G06Q 2220/00* (2013.01); *H04L 2209/56* (2013.01)

(56) References Cited

U.S. PATENT DOCUMENTS

| | | | | |
|---|---|---|---|---|
| 2017/0187535 | A1* | 6/2017 | Middleton | G06Q 20/02 |
| 2018/0276626 | A1* | 9/2018 | Laiben | G06Q 20/02 |
| 2019/0220859 | A1* | 7/2019 | Weight | G06Q 20/3827 |
| 2019/0268165 | A1* | 8/2019 | Monica | H04L 9/3236 |
| 2019/0287174 | A1* | 9/2019 | Black | H04L 9/3239 |
| 2019/0333051 | A1* | 10/2019 | Brogger | H04L 9/3239 |
| 2020/0266997 | A1* | 8/2020 | Monica | H04L 9/0822 |

OTHER PUBLICATIONS

"BitAuth, for Decentralized Authentication", bitty, Engineering, Jul. 1, 2014, https://bitpay.com/blog/bitauth-for-decentralized-authentication/.

"Coinbase Commerce API", https://web.archive.org/web/20180507175332/http://commerce.coinbase.com/docs/.

"Integrate crypto payments into your .Net applications with AtomicPay", https://msicc.net/integrate-crypto-payments-into-your-net-applications-with-atomicpay/, Jan. 10, 2019.

Faridi, Omar, "Global Cryptocurrency Payments Solution to Support 156 Crypto-to-Fiat Options", https://www.cryptoglobe.com/latest/2019/01/non-custodial-crypto-payment-solution-launched-by-atomicpay/, Jan. 13, 2019.

Gogo, Jeffrey, "Thai Startup Atomicpay Launches Non-Custodial Cryptocurrency Payments Platform", https://news.bitcoin.com/thai-startup-atomicpay-launches-non-custodial-crpto-payment-plafform/ Jan. 12, 2019.

Petersen, Cole, "Coinbase Commerce Announces Addition of New Features, Faces Increasing Competition", Cryptocurrency Technology, Aug. 3, 2018, (https//www.newsbtc.com/category/crypto-tech/).

"BitPay Introduces Stable Coin Settlements in Gemini Dollars and Circle USD Coin", https://bitpay.com/blog/stable-coin-settlement/, Oct. 15, 2018.

"ERC20 Token Payment Processing—Powered by CoinPayments", https://blog.coinpayments.net/announcements/erc20-token-payment-processing-powered-by-coinpayments, May 28, 2018.

Andrews, Jordan, "The CREATE2 OpCode and DApp Onboarding in Ethereum", https://hackernoon.com/the-create2-opcode-and-dapp-onboarding-in-ethereum-e2178e6c20cb, Jan. 12, 2019.

Strelov, Aleksandr, "Accepting payments in Ethereum and ERC20 tokens", steemit, https://steemit.com/cryptocurrency/@ivelon/accepting-payments-in-ethereum-and-erc20-tokens.

"Merchant Payment Gateway", Coingate, https://developer.coingate.com.

* cited by examiner

SYSTEMS AND METHODS FOR WITHDRAWAL CONSOLIDATION

CROSS-REFERENCE TO RELATED APPLICATIONS

This application claims priority to U.S. Provisional Application No. 62/814,194 filed 5 Mar. 2019 and U.S. Provisional Application No. 62/836,259 filed 19 Apr. 2019, each of which is incorporated herein in its entirety by this reference.

TECHNICAL FIELD

This invention relates generally to the cryptocurrency field, and more specifically to a new and useful system and method for providing withdrawal consolidation in the cryptocurrency field.

BACKGROUND

In the field of cryptocurrency, digital wallets are utilized to maintain cryptocurrency funds. E-commerce involving cryptocurrency is on the rise, and services catering to commercial and mercantile entities are growing. While such services have used conventional digital wallets in the past, there are downsides. A primary downside relates to addresses, which in cryptocurrency represent placeholders or identifiers which can be used to accept and send blockchain transactions. Digital wallets often include addresses, which can be derived from a user's public key. One particular downside of conventional digital wallets is that when a cryptocurrency service associates multiple cryptocurrency addresses with a single user through the user's public or private key, conventional digital wallets don't work, because there are too many addresses associated with the user for the digital wallet to monitor. As a result, the conventional digital wallet often freezes or hangs, doesn't show the complete balance, or presents other errors.

Furthermore, some cryptocurrency commerce services are moving towards non-custodial service, wherein the service does not maintain custody of the private key, and therefore does not maintain custody of funds, on behalf of its users. In a non-custodial commerce platform, the platform stores what needs to be signed for a transaction, and the wallet at the user device stores how to sign the transaction. Because the platform does not store the private key, the platform cannot consolidate cryptocurrency funds, thereby resulting in large transactions per withdrawal. The platform also cannot use different private keys per transaction, also resulting in large transactions and increased security risks.

Thus, there is a need in the cryptocurrency field to create a new and useful system and method for providing a non-custodial payment platform that enables cryptocurrency transfers.

DESCRIPTION OF THE PREFERRED EMBODIMENTS

Figure 1A:
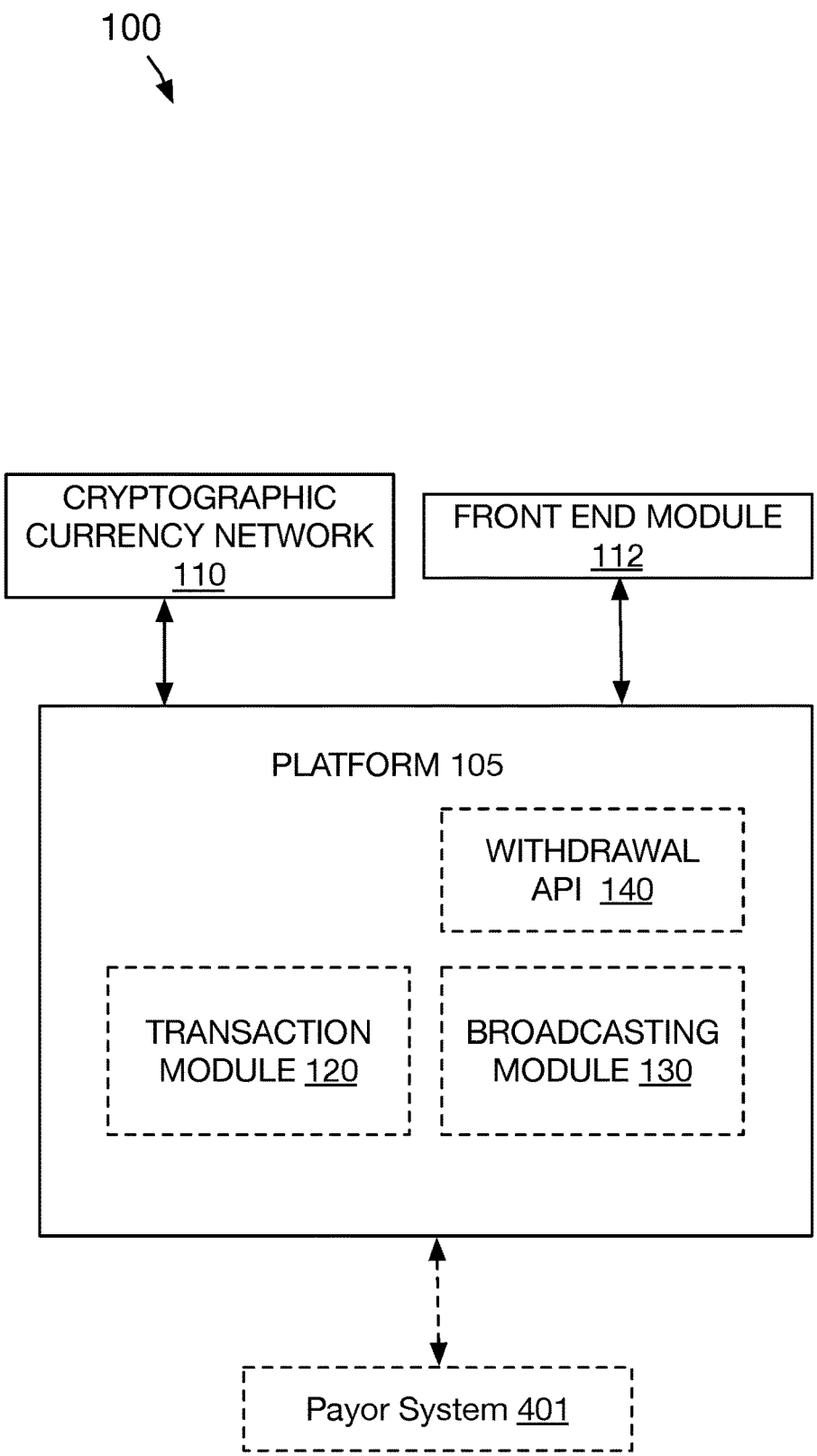
FIGS. 1A-B are schematic representations of the withdrawal consolidation system.

The following description of the preferred embodiments of the invention is not intended to limit the invention to these preferred embodiments, but rather to enable any person skilled in the art to make and use the embodiments disclosed herein.

1. Overview.

There is a need for providing consolidation of withdrawals for non-custodial payment platforms. This disclosure herein provides such a new and useful system and method.

The method for withdrawal consolidation includes at least one of: storing payment unit information associated with a user; receiving a withdrawal request from a user device; selecting payment representations to satisfy the withdrawal request; generating a transaction based on the selected payment representations; sending unsigned transactions to the user; receiving signed transactions; and sending signed transactions to the blockchain at a single withdrawal destination.

In some embodiments, the method functions to provide a non-custodial payment platform that enables cryptocurrency transfer. A "non-custodial" payment platform is a payment platform in which the platform is not the custodian of the funds. Within a cryptocurrency payment platform, this requires that the private keys never reach any server or storage space that is on or part of the platform. This means that if a merchant is using a commerce platform that is non-custodial in nature, that merchant is ultimately responsible for the safety of its funds, as the merchant completely owns (e.g., is intended to have sole authorization or access to) the environment where the keys are stored. While a non-custodial environment will not be able to guarantee the safety of a user's funds because it does not store or take action on those funds on a user's behalf, such an environment will nevertheless have reason to provide as safe and pleasant experience as possible, and enable merchants to withdraw and transfer cryptocurrency in a secure and efficient manner.

To this end, in some embodiments, the method functions to track the cryptocurrency payment destinations associated with a user (e.g., a merchant) on the platform, select multiple payment representations (e.g., cryptocurrency payment representations), from the various payment destinations associated with the user such that they sum up to at least the requested withdrawal amount, and optionally consolidate those payment representations in a multi-stage batched process (e.g., if more than a threshold number of payment representations are selected to satisfy the withdrawal amount). The method then generates a transaction with a single withdrawal destination for the payment representations to be sent to, sends the unsigned transaction to the user, receives the signed transaction from the user, and transmits the signed transaction to the cryptocurrency network for validation.

All or portions of the method can be performed at a predetermined frequency, performed upon occurrence of an execution event (e.g., upon a user navigating to the payment platform, upon a user viewing a user dashboard on a user interface for the payment platform, upon a user sending a withdrawal or transfer request to the payment platform, etc.), or performed at any other suitable time.

2. Benefits.

This method can confer several benefits over conventional cryptocurrency transfer methods on payment platforms.

First, the method allows users to use third-party wallets. Since the transfer is occurring on a non-custodial payment platform, the user is free to use whichever third-party wallet is suitable or desirable, agnostic to the payment platform.

Second, the method enables "withdrawal" from a non-custodial payment platform, e.g., transferring the payment units of the user to a separate withdrawal destination, which is not always available or optimal in a non-custodial platform. This allows a user to transact using the non-custodial payment platform, while maintaining custody of their own assets.

Third, the method segregates the expensive and technically difficult portions of using cryptocurrency from cryptocurrency ownership, specifically private key custody. This allows a user to control their own cryptocurrency funds by holding their own private keys, while handling all the difficult portions of using the cryptocurrency at the platform: maintenance of hardware and software infrastructure; the monitoring required to transact on the cryptocurrency network (e.g., monitoring blockchain to determine when payments are made); invoice payment confirmation based on blockchain monitoring; balance calculation from the cryptocurrency transactions; and payment unit selection, particularly when the cryptocurrency protocol limits the number of payment units within a transaction.

Fourth, the method is particularly beneficial and useful for merchants. Using cryptocurrency means merchants need not store sensitive customer payment information, and using this method means merchants can lower expenses related to startup and maintenance costs.

Fifth, variants of the method result in increased security, user privacy, and per-payment trackability by generating different payment destinations (receiving addresses) for each transaction. If a merchant is set up to have all of its customers pay to the same payment destination, it is relatively trivial for an outsider to calculate the revenue of that merchant. By generating a different payment destination for each transaction, these variants can protect the merchant from destination-specific attacks. The different payment destinations can further function as individual transaction identifiers for each payment, which can be used to verify whether a given customer has paid.

Sixth, variants of the method can add an additional layer of security by using consolidation addresses during withdrawal, which consolidate payments from the different receiving addresses into a single consolidation address (e.g., in a set of consolidation transactions) before transfer to the destination address. This reduces the number of transactions being sent to the destination address to a single transaction, which is easier for a user to map to a single withdrawal request. This can also introduce an intermediate check point (e.g., between consolidation transaction verification and destination transaction publication) for additional security checks and debugging.

3. System.

As shown in FIG. 1A, the withdrawal consolidation system can include one or more of: a cryptographic currency network 110, a front end module 112, a platform 105, a payor system 401, an optional transaction module 120, and an optional broadcasting module 130.

Cryptographic currency network (CCN) 110 is a network operated according to a cryptocurrency protocol. In some embodiments, the CCN may be a blockchain network operated according to a blockchain protocol. In various embodiments, such cryptocurrency protocols are implemented via software, and may include the Bitcoin cryptocurrency protocol as implemented by bitcoind, the Ethereum cryptocurrency protocol as implemented by Geth, or any cryptocurrency protocol implemented in one or more ways. In some embodiments, the cryptocurrency network is a network in which one or more digital cryptocurrencies are bought, sold, and/or transferred. In some embodiments, the cryptocurrency network 110 includes one or more smart contracts or other programs operating on top of the cryptocurrency protocol.

The front end module 112 functions to receive an unsigned transaction, determine a private key, validate that the unsigned transaction has the right payment information, such as receiving addresses, withdrawal destination information, and amount, and sign the unsigned transaction. The front end module can optionally: delete the private key after signing; generate the destination transaction based on the withdrawal destination information and the consolidation address; publish signed transactions to the respective CCNs; transmit information (e.g., withdrawal information, charge information, signed transactions, etc.) to the platform; authenticate the user (e.g., using a password, multifactor authentication); store user credentials (e.g., username, password); determine the asymmetric key pair (e.g., public key and private key) and send the public key to the platform; and/or perform any other suitable functionality.

The private key can be determined based on a seed or mnemonic; be decrypted using a passphrase (e.g., user passphrase, biometric information, etc.); or otherwise determined. The seed or passphrase can be received from a user, from a client system, from cold storage, or otherwise received.

The private key is preferably paired with a public key (e.g., cooperatively forming an asymmetric key pair), wherein the public key is used to generate cryptocurrency addresses (e.g., receiving addresses, consolidation addresses, etc.). The cryptocurrency addresses can be HD (hierarchical deterministic) addresses, UTXO addresses, externally owned account addresses, contract addresses, or other address types. The private key is preferably stored by the user, but can additionally or alternatively be stored by the platform 105 or the front end module 112. The public key (or an instance thereof) is preferably stored by the platform 105, but can be otherwise stored.

The private key can be an extended private key (xPub Key) paired with an extended public key (xPriv Key), such as that generated using BIP32, but can be any other suitable private key generated using any other suitable protocol. In variants, the xPub Key is used to generate child public keys that are subsequently used to generate the cryptocurrency addresses, directly used to generate the addresses, or otherwise used.

In some embodiments, a user has a public-private key pair associated with the user's cryptocurrency account. The public key is broadcast publicly, and the platform 105 stores the public key for that user. The platform 105 uses the public key whenever a transaction needs to be signed. The public key is run through a hash function, which is one-way and deterministic, to obtain a payment destination for each charge request that the user receives. The platform 105 then monitors that payment destination for any incoming payments. Because the hash function is one-way, the platform 105 cannot retrieve the public key from a payment destination. In some embodiments, the platform 105 instead stores the payment destination for the user in association with a user account identifier. Upon a user requesting to withdraw funds, the method selects a set of payment representations to aggregate for the withdrawal transaction, and sends them to a sandbox (e.g., the front end module), which includes the hash function. Because payment destinations were generated from users' public keys, the public key and private key are cryptographically linked, so a user's private key can be used to digitally sign the transactions associated with the correct corresponding payment destinations for that user. In some embodiments, the user is asked to enter a private encryption seed, which can be, e.g., a 12 word mnemonic or other form of encryption seed. The private key is then derived from the encryption seed and is used to digitally sign the transactions (e.g., in the signing enclave). In a first variation, a private key is determined based on a seed or mnemonic; used to cryptographically sign the withdrawal transaction(s); and discarded. In a second variation, a private key stored by the user device (and/or front end module) is decrypted using a user input; used to cryptographically sign the withdrawal transaction(s); and the clear text public key is discarded. However, the private key can be otherwise determined.

In some embodiments, the front end module 112 can be or include a dedicated host (e.g., sandbox) with a dedicated platform endpoint (e.g., with a strict content security policy). The dedicated host can be a special iFrame, a browser, a native application, or another software component or application. In some implementations, the front end module is executed by a user device (e.g., a device having at least a processor and a memory, such as a smartphone, laptop, desktop, tablet, headset, etc.). In some implementations, the front end module is executed by a client executing on a user device (e.g., native application, browser application, etc.). However, the front end model can be otherwise executed. The front end module 113 can be integrated into a third party website (e.g., via an API), launched in response to button selection, include a user interface, or be otherwise presented.

Figure 1B:
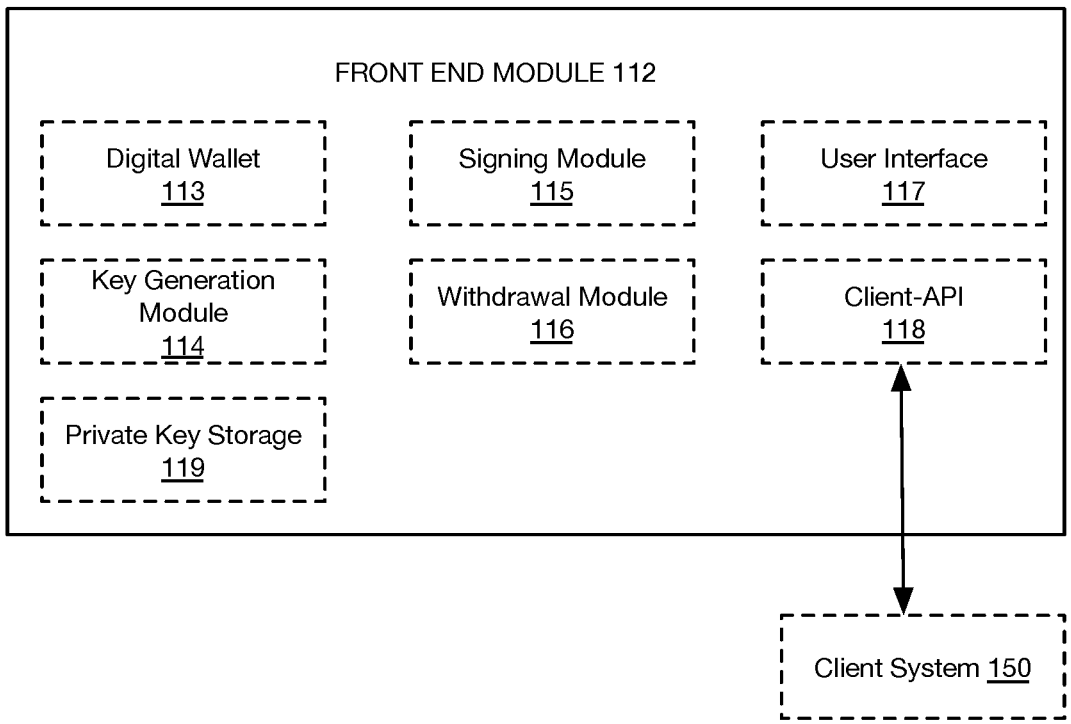

FIG. 1B is a schematic representation of the front end module 112, according to some embodiments. The front end module 112 can include one or more of a digital wallet 113, a key generation module 114, a signing module 115, a withdrawal module 116, a user interface 117, a client-API 118, and a private key storage 119.

The digital wallet 113 functions to generate asymmetric keypairs, generate addresses, track addresses (generated from the public key(s)), track transactions, and otherwise manage a user's balance for one or more cryptocurrency assets (e.g., one or more CCNs). In some embodiments, the digital wallet 113 is a Hierarchical Deterministic (HD) wallet. For example, the HD wallet can automatically generate a hierarchical tree-like structure of private/public addresses (or keys). However, the digital wallet 113 can be a sequential deterministic wallet or be any other suitable wallet. In some variations, the digital wallet includes an extended public key (xPub) that is used to generate public addresses. For example, the wallet can use the extended public key generate a new receiving address (payment destination) for each new payment to the wallet, or a withdrawal destination for receiving withdrawals from the platform. However, the digital wallet can be any suitable type of digital wallet that is compatible with one or more cryptocurrency protocols.

The digital wallet 113 can support one or more cryptocurrency protocols. When the digital wallet 113 supports multiple cryptocurrency protocols, the same or different asymmetric key pair (e.g., same or different public/private key pair) can be used for each cryptocurrency protocol, respectively (e.g., used to generate addresses). Examples of cryptocurrency protocols that can be supported include: Bitcoin (e.g., supporting legacy addresses (P2PKH), nested SegWit addresses (P2SH), native SegWit addresses (bech32), or other address formats), Bitcoin Cash, DAI, Ethereum, Litecoin, USD Coin, other ERC20 tokens, and/or any other suitable cryptocurrency protocol.

In some embodiments, the key generation module 114 functions to generate public/private key pairs). In some variations, the key generation module 114 can generate one or more key-pairs that include an extended public key and a corresponding private key, wherein the private key can be used to sign transactions that transfer cryptocurrency from any address generated by using the extended public key. In some variations, the key generation module can optionally generate addresses. In one a first example, is a segwit key generation module that functions to generate segwit addresses. In a second example, the key generation module is a bech32 key generation module that functions to generate bech32 addresses. However, the key generation module can be any suitable type of key generation module that is compatible with one or more cryptocurrency protocols.

In some embodiments, the signing module 115 functions to sign unsigned transactions with a private key (e.g., the private key discussed above). In some variations, the signing module is executed within a dedicated host (e.g., that receives unsigned transactions from the front end module 112 or platform 105 and sends signed transactions to the front end module 112 or platform 105), but can be otherwise executed. In some variations, the signing module is executed within the front end module 112. In variants, the signing module 115 can optionally verify the unsigned transaction's information prior to signing (e.g., verify the withdrawal amount, verify that the recipient addresses are generated from the corresponding public key, etc,); however, unsigned transaction verification can be otherwise performed. In some embodiments, the signing module is a segwit signing module. In some embodiments, the signing module is a bech32 signing module. However, the signing module can be any suitable type of signing module that is compatible with one or more cryptocurrency protocols.

In some embodiments, the withdrawal module 116 functions to generate cryptocurrency withdrawal requests. In some variations, the withdrawal module includes an interface for sending withdrawal requests to the platform 105. In some variations, the withdrawal module is constructed to send withdrawal requests to the platform 105 by using a withdrawal API (application programming interface) (e.g., 140 of the platform 105.

In some variations, the withdrawal module includes the user interface 117. However, the user interface 117 can be included in the front end module in any suitable arrangement. The user interface 117 can include a user-interface element for receiving a user-specified private key (or seed or secret passphrase).

In some variations, the front end module 112 can include a charge module that functions to initiate invoice or charge generation for a payee. In variants, the charge module includes an interface (e.g., an API) for sending invoice requests to the platform 105. The invoice requests can include: a request for a recipient address, an invoice identifier (e.g., invoice number, invoice amount), an invoice amount, the payee, and/or other information, In some variations, the withdrawal module and/or charge module includes the client-API 118, which functions to interface with one or more client systems 150 (e.g., accounting systems, billing system, e-commerce systems, shopping cart systems, point of sale systems, secure storage systems, digital wallets, hardware wallets, and the like). However, the client-API 118 can be included in the front end module in any suitable arrangement.

In variants, the client-API 118 can include a programmatic interface for receiving a private key or precursors thereof (or seed or secret passphrase) from one or more client systems. In these variants, the client-API 118 can provide direct access to the signing module, which directly receives, uses, and discards the private key or private key precursor. However, the private key or precursor can be otherwise received or determined.

In some embodiments, the front end module 112 is included in a client system (e.g., accounting system, billing system, e-commerce system, shopping cart system, point of sale system, secure storage system, digital wallet, hardware wallet, and the like).

In some embodiments, the front-end module is or includes a secure module (e.g., a dedicated host) that includes (or has access to) a secure memory (or memory location) that is not accessible to the platform 105 and/or the device executing the front-end module. In some variations, the front-end module is executed by a client device (or system) in a secure execution environment provided by the client device (e.g., a secure application process provided by an operating system of the client device, a secure application processes provided by a browser executed by the client device, such as an iFrame, etc.). In some variations, the secure execution environment prevents other processes (e.g., the platform 105) from accessing data (e.g., private keys, seeds, passphrases, etc.) used by the front-end module and prevents other processes from altering the machine-executable program instructions of the front-end module. In some variations, the front end module 112 can store the private keys for the user, retrieve the private keys from secure storage, or otherwise access the private keys within a secure execution environment. The front end module 112 (or a signing module 115) can be launched in response to receipt of a withdrawal or other signing input, but can be launched at any suitable time. In variants, the front end module 112 only interacts with a limited set of endpoints. For example, the front end module 112 can: only accept or respond to messages received from a trusted endpoint (e.g., messages signed by the platform, with the platform's private key, etc.), reject messages sent by a set of blacklisted endpoints, and/or otherwise control access. In some variations, the front end module 112 is (or includes) one or more of: a secure iFrame, a secure browser process, a secure native application, a sandbox, a secure application process, a secure operating system process, a secure thread, a secure processing core, a secure processing system, a secure virtual machine, a hardware signing wallet (e.g., Trezor, Ledger Nano), a hardware security module (HSM) (e.g., AWS CloudHSM™), or any suitable type of secure application process, secure system, or secure hardware device. In some variants, the front end module 112 (or at least one component included in the front end module) is controlled by one of an accounting system, a billing system, a point of sale system, and an e-commerce system. However, in some variations, the front end module 112 (or at least one component included in the front end module) can be otherwise controlled.

The front end module can optionally include an encryption module that functions to encrypt: the private key (e.g., when stored by the front end module), communications with the platform (e.g., using symmetric or asymmetric key encryption), or other data. The front end module can optionally store platform authentication credentials, such as API tokens.

The front end module can optionally include a fee module that functions to estimate a fee for the withdrawal transaction (or payment transaction). The fees can include: network fees (e.g., miner fees, network transaction fees, priority fees, etc.), platform fees, and/or other fees. The fee module can determine (e.g., retrieve, calculate, etc.) the estimated fee based on: a response from the platform or a third-party fee estimation system, the network conditions, or otherwise determined. The fee module can determine one or more fees for one or more transaction parameters. For example, the fee module can determine different fees for different withdrawal speeds (e.g., a high, medium, and low fee for a prioritized, medium, and slow withdrawal, respectively).

In a first variation, the front-end module 112 is a platform-provided module. In a second variation, the front-end module 112 is a third-party module. In some variations, the front-end module is a special purpose module that is specifically constructed to communicate with the platform 105. In a first example, the front-end module can send signed transactions only to the platform 105. In a second example, the front-end module can send signed transactions to the platform 105, as well as other systems or modules.

The system can optionally include a user interface, which functions to display information associated with the user account (e.g., stored by the platform). The displayed information can include: balances (e.g., for one or more cryptocurrencies, from the ledger, aggregated from the respective blockchains, etc.); the states of individual transactions for each payment destination address (e.g., for used or unused payment addresses); and/or other information.

In some embodiments, platform 105 functions to: monitor one or more blockchains for transaction validation, publish and/or manage signed transaction publication to the blockchains, maintain ledgers for each user (e.g., to track the user's balance), generate recipient addresses, generate consolidation addresses, select payment units (e.g., select addresses, select coins, etc.) to meet withdrawal or payment amounts, generate unsigned transactions (e.g., consolidation transactions, destination transactions, etc.), verify signatures of signed transactions (e.g., before blockchain publication), maintain blockchain nodes, and/or perform other functionalities. The platform 105 can be implemented on a remote server system, distributed computing systems, local computing systems, or other conceivable computing and/or network systems. The platform 105 can be implemented by a platform management entity, an entity associated with a CCN, an entity associated with a cryptocurrency payment platform, and/or any other entity, service, or individual. In a preferred embodiment, one or more aspects of the system may be enabled by a web-based software platform (e.g., the reconciliation platform) operable on a web server or distributed computing system. In some embodiments, the platform 105 interacts with the CCN 110, front end module 112, and/or one or more user device(s).

In a preferred embodiment, the platform 105 is a non-custodial platform. Alternatively, the platform 105 is custodial and is capable of storing private keys. The platform 105 interacts with the CCN no. In some embodiments, the platform 105 transmits signed transactions to the CCN no, syncs with other computing nodes (e.g., blockchain nodes implemented via a node software that fully validate transactions and blocks) for the CCN no, and/or monitors the CCN no for payment.

In some embodiments, the platform 105 is a cryptocurrency platform. In a first variation, the platform 105 is a cryptocurrency payment platform. In a second variation, the platform 105 is a cryptocurrency exchange. In a third variation, the platform is a hosted digital wallet for cryptocurrency. However, the platform can be any suitable type of platform. In some variations, the platform 105 is a multi-currency cryptocurrency platform that provides cryptocurrency services for a plurality of types of cryptocurrency assets (e.g., Bitcoin, Ethereum, and the like). In a first variation, the platform 105 is a multi-tenant platform. In a second variation, the platform 105 is a single-tenant platform.

In some embodiments, the platform 105 includes a withdrawal API 140. The withdrawal API can be any suitable type of API, such as a public API, a private API, a REST API, an HTTP-based API, a native API, and the like.

In some embodiments, the platform 105 optionally includes a transaction module 120. The transaction module 120 functions to generate unsigned transactions. A transaction is an event permitted by the underlying blockchain or cryptocurrency protocol. A transaction can be, for example, a transfer of cryptocurrency value. In some embodiments, the transaction module selects one or more payment units to satisfy a withdrawal request. Different payment units can be represented by different addresses (e.g., recipient addresses), accounts, or otherwise represented. The payment units are preferably selected such that the respective associated cryptocurrency amounts cooperatively sum to at least the withdrawal amount from the withdrawal request, the withdrawal amount and the fee, or otherwise selected. In some embodiments, the transaction module generates a series of transactions that cooperatively satisfy a withdrawal request, e.g., when the number of payment units exceeds the per-transaction limit set by the CC protocol. The transition module then sends the unsigned transactions to the user or device(s) associated with the user. In some embodiments, the unsigned transactions are provided for display in a visual format, graphical user interface, user dashboard, or any other form of display.

In some embodiments, the platform 105 optionally includes a CCN node 130 (e.g., broadcasting module). The CCN node 130 functions to send signed transactions to the CCN no, and monitor the CCN no for transaction verification. In some embodiments, the CCN node 130 verifies transactions cryptographically.

In some embodiments, the payor system is one or more of: an accounting system, billing system, e-commerce system, shopping cart system, point of sale system, secure storage system, digital wallet, hardware wallet, a web-site plugin, a third party payment processor (e.g., credit card company, etc.), a merchant payment system, a smart device, a robot, a vehicle, a medical device, a data logger, a mobile device, or any other suitable type of system that can generate (and optionally broadcast) cryptocurrency payment transactions.

5. Method.

Figure 2A:
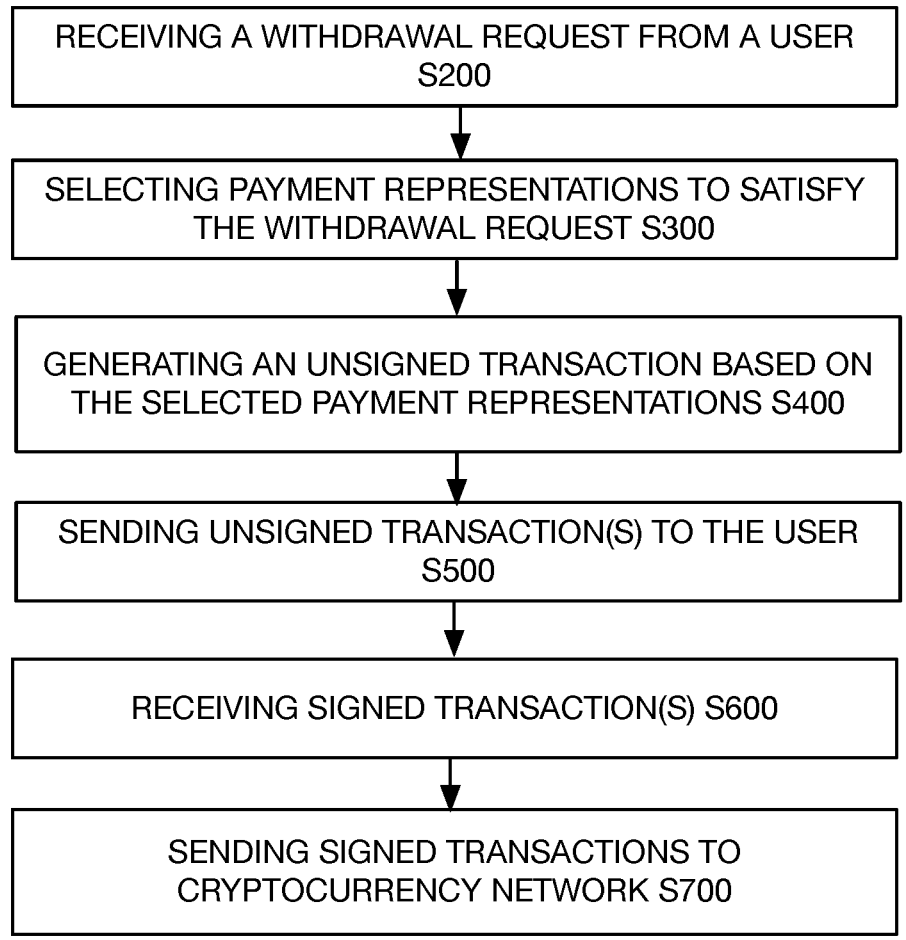
FIGS. 2A-B are flowchart representations of the withdrawal consolidation method.
Figure 2B:
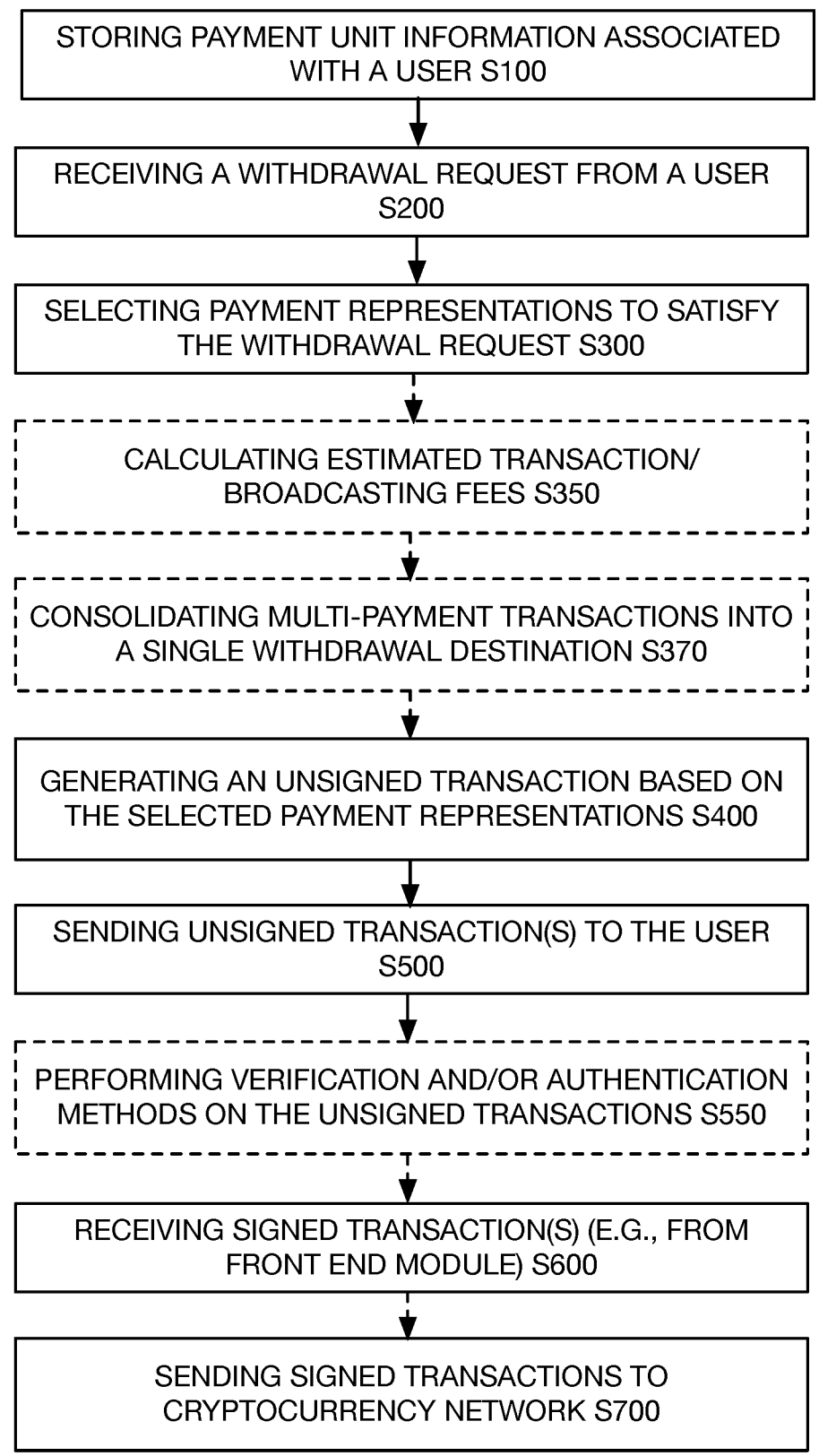
Figure 4:
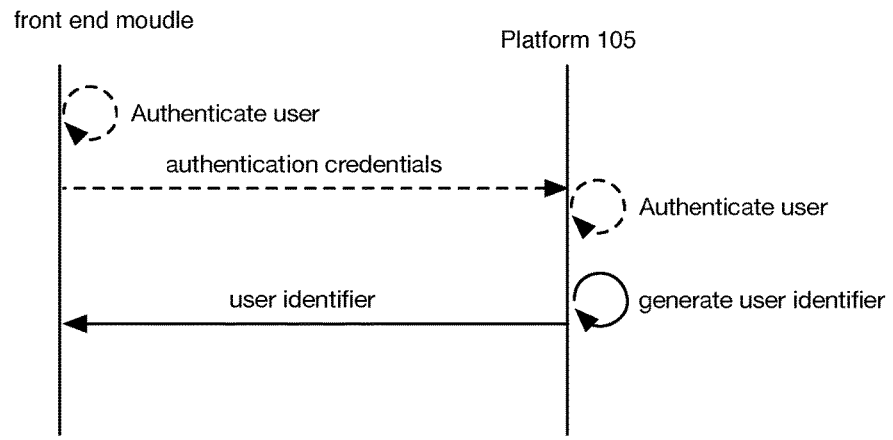
FIG. 4 is an illustration of an example of requesting a user identifier.

FIGS. 2A-B and 4 are representations of the method, according to embodiments. In some embodiments, the method is a withdrawal consolidation method. In some embodiments, the method functions to facilitate payment unit withdrawal from a crypto currency payment platform. Withdrawal refers to transferring payment units to a wallet or other external address, but can alternatively refer to converting the payment units to fiat (e.g., by selling the payment units to the platform 105 or third party) and transferring the fiat off the platform, or otherwise withdrawing payment unit value. Some or all of the method can be performed on-chain or off-chain.

As a first example, in some embodiments, the method functions to: identify Unspent Transaction Outputs ("UTXOs") generated from multiple customer payments to a merchant, generate one or more transactions with the identified UTXOs and a merchant-specified withdrawal destination, facilitate transaction signing by the merchant, and transmit the signed transaction(s) to the cryptocurrency network. Cryptocurrency is then "transferred" to the merchant specified withdrawal destination (e.g., withdrawn) upon verification by the cryptocurrency network.

As a second example, in some embodiments, the method functions to: identify a plurality of accounts that have received customer payments to a merchant, generate one or more transactions to transfer funds from the identified accounts to a merchant-specified account, facilitate transaction signing by the merchant, and transmit the signed transaction(s) to the cryptocurrency network. Cryptocurrency is then "transferred" to the merchant specified account (e.g., withdrawn) upon verification by the cryptocurrency network.

In some embodiments, at least one component of the system 100 performs at least a portion of the method. The method can include one or more of: storing payment unit information (S100); receiving a withdrawal request (S200); selecting payment representations (S300); calculating estimated fees (S350); consolidating multi-payment transactions (S370); generating an unsigned transaction based on the selected payment representations (S400); sending at least one unsigned transaction (S500); performing verification on the unsigned transaction (S550); receiving at least one signed transaction(S600); and sending at least one signed transaction to a cryptocurrency network (S700).

Figure 6:
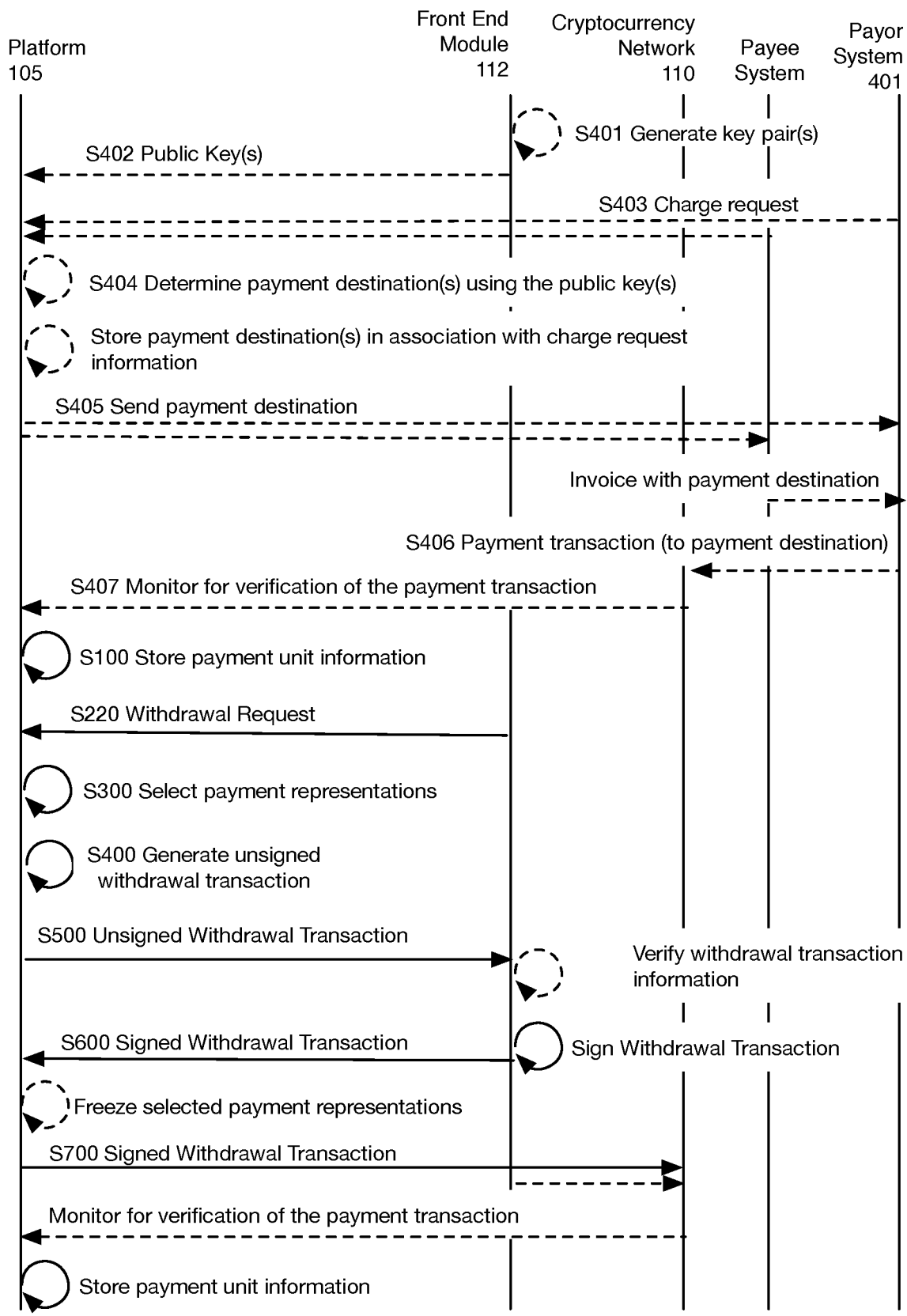
FIG. 6 is an illustration of an example of a method including withdrawal.
Figure 7:
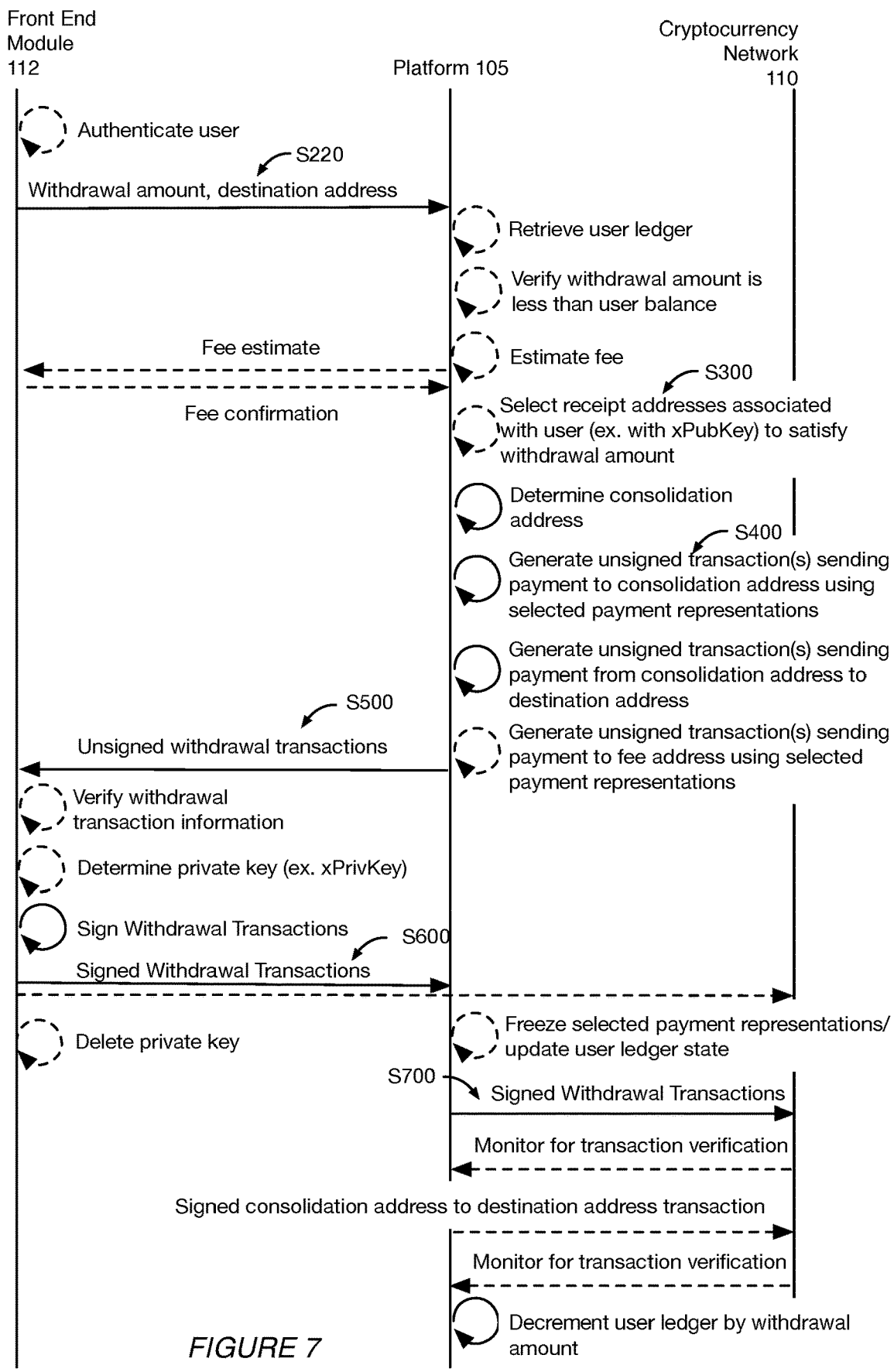
FIGS. 7 and 8 are schematic representations of examples of the withdrawal consolidation method with different variants of constituent processes.

The method can optionally include one or more of: providing a front end module to a client device; generating at least one key pair (e.g., a public/private key pair) (e.g., S401 shown in FIG. 6); receiving a public key (e.g., S402 shown in FIG. 6); receiving a charge request (e.g., S403 shown in FIG. 6); determine (or generate) a payment destination(s) by using the public key (e.g., S404 shown in FIG. 6); sending a generated payment destination (e.g., S405 shown in FIG. 6); generating a payment transaction by using the public key; generating a payment transaction by using a generated payment destination (e.g., S406 shown in FIG. 6); and monitoring the cryptocurrency network for verification of the payment transaction (e.g., S407 shown in FIG. 6).

At S100, the method operates to store payment unit information associated with a user. Payment unit information can include: payment units associated with payment destinations, account balances associated with payment destinations, and/or other information. The payment unit information can be stored by the platform, by the front end (e.g., for payment destinations that the front end instance has generated transactions for, has received from the platform, etc.), or otherwise stored. In a first variation, S100 functions to track all payment destinations associated with a user (e.g., recipient addresses). In a first variation, payment destinations include cryptocurrency addresses (e.g., defined by a cryptocurrency protocol). Cryptocurrency addresses can include bech32 addresses, segwit addresses, or any suitable type of cryptocurrency address. In a second variation, the payment destinations include cryptocurrency accounts (e.g., defined by a cryptocurrency protocol). In a third variation, the payment destinations include a combination of cryptocurrency accounts and cryptocurrency addresses.

The method can optionally include generating payment destinations for a user (e.g., S404, as a separate process, etc.). The payment destinations can be generated by a payment-destination endpoint (PDE) that stores or has access to the data used to generate the payment destination (e.g., public key), but can be generated by another system. The payment-destination endpoint the platform, by the front end module, by the user's wallet, or by any other suitable system. Multiple payment destinations are preferably generated asynchronously (e.g., one generated for each generation request), but can be generated as a batch or otherwise generated.

Different payment destinations are preferably generated for each unique transaction (e.g., charge requests, such as S403 shown in FIG. 6), but can alternatively be generated for each customer (e.g., payor), each user, each epoch (e.g., time frame), or generated at any other suitable frequency for any other suitable entity. Additionally or alternatively, a single payment destination can alternatively be generated for multiple invoices, multiple payment destinations are generated for each invoice, and/or any other suitable number of payment destinations can be generated for any other suitable invoice. Payment destinations for different cryptocurrencies can be generated from the same or different public key.

For example, different payment destinations can be generated from data associated with a user (e.g., a merchant) to receive payment for a second user (e.g., a customer who is a payor). The data used to generate the payment destinations can be: the user's public key (e.g., an extended public key), the user's private key, a seed, a user password, an API token assigned to the user, or any other suitable data.

Figure 5:
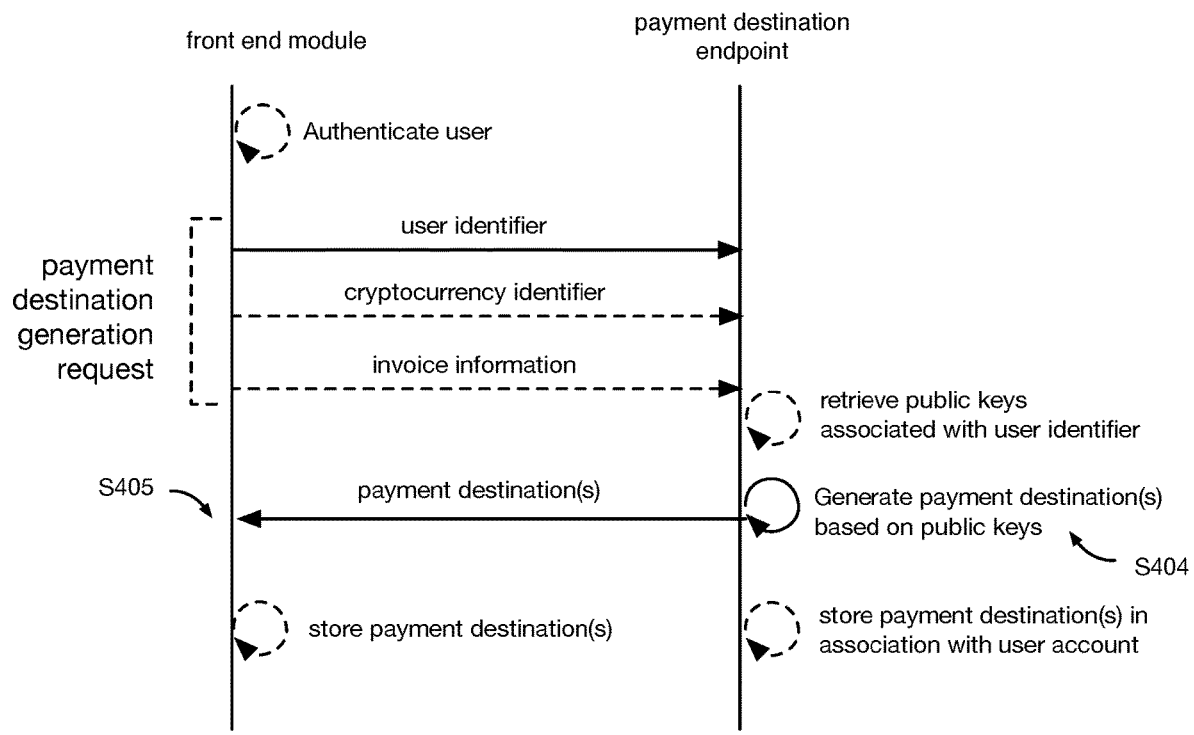
FIG. 5 is an illustration of an example of payment destination generation.

One or more payment destinations can be generated in response to determination of a destination generation event. Examples of destination generation events include: receipt of a payment destination generation request (PDGR), example shown in FIG. 5; user authorization by the payment-generating endpoint (e.g., based on received user credentials; received username and password; multifactor authorization; out of band authorization; etc.); receipt of a user identifier (e.g., an API token, API key, a session key, a cryptographic hash, a randomly generated string, or other user identifier globally; etc.); receipt of a token generated by trusted secondary endpoint (e.g., wherein the PDE receives the token from the trusted secondary endpoint, optionally in association with a user identifier, such as a username); receipt of an API request with a user identifier (e.g., as discussed above); and/or occurrence of any other suitable destination generation event. The user identifier, tokens, or other user or session identifiers can be generated and stored by the platform in association with the user account and returned to the front end module; generated by the front end module and sent to the platform; and/or otherwise generated. The user or session identifiers are preferably locally stored in temporary or persistent storage in cleartext or ciphertext, but can be stored on paper or otherwise stored.

The payment destination generation request (PDGR) functions to request a payment destination from the PDE. The PDGR can be: the same as the charge request, part of the charge request (e.g., subcomponent of the same request, subset of the charge request process, etc.), different from the charge request, or otherwise related to the charge request. The payment destination generation request can be: an API call (e.g., to a public endpoint), a call to a predetermined URL (e.g., public URL with the PDR appended at the end), a button press or icon selection (e.g., that triggers an API call), and/or have any other suitable format. The payment destination generation request can include: a user identifier, a cryptocurrency selection, a device identifier (e.g., for the device sending the request), a signature (e.g., signed by the private key), metadata (e.g., generated by the front end module, entered by a user, automatically determined from the user device that the front end module is running on, etc.), invoice information (e.g., payee, invoiced items, charge amount, etc.), and/or other information that can be used to determine which public key and/or account a payment destination should be generated for (example shown in FIG. 5).

In a first example, the payment destination generation request includes a user identifier (e.g., token), wherein the PDE generates and returns a different payment destination (e.g., cryptocurrency addresses) for each of the authorized cryptocurrencies for the user identifier (e.g., based on the respective protocols) from the user's public key (e.g., from the same or different child public keys from the xPubKey). In one example, the payment destination can be generated as disclosed in Appendix A, incorporated herein in its entirety by this reference.

In a second specific example, the payment destination generation request includes the user identifier (e.g., token) and a cryptocurrency identifier, wherein the PDE generates and returns a payment destination for the specified cryptocurrency (e.g., generated from the user's public key).

In a third specific example, the payment destination generation request includes the user identifier (e.g., token) and a device identifier, wherein the PDE generates and returns one or more payment destinations (e.g., generated from the user's public key) and stores the generated payment destinations in association with the device identifier.

The user identifier can be used to: authorize payment destination generation; identify the user account for which the payment destination should be generated; identify the public key to be used for payment destination generation, or otherwise used. The user identifier is preferably unique to and associated with the user (e.g., user account), but can additionally or alternatively be shared across multiple users or accounts (e.g., related accounts), specific to or shared across devices, or otherwise shared. The user identifier can be associated with the user account, a scope of permissions (e.g., only allowed to request payment destination generation; only allowed to generate payment destinations for authorized cryptocurrencies; etc.), an expiration time (e.g., indefinite, months, days, hours, etc.), and/or other information. The user identifier can be requested from an API endpoint (e.g., using account credentials, login information) or other endpoint. The user identifier can be generated by the platform (example shown in FIG. 4); be generated using a user interface that calls the API endpoint or locally generates the user identifier; generated by a secondary device or platform; and/or otherwise generated. The user identifier can be generated: from the public key associated with the account; from the account information (e.g., username), using a random number generator; using conventional methods (e.g., Json web token, OAuth, etc.); and/or otherwise generated.

When the payment destinations are generated by the platform and received by the front end module, the front end module can optionally store the received payment destinations. The stored payment destinations can be used to: generate invoices; provide a payment endpoint to a payee; query the platform or the respective blockchains for transaction statuses (e.g., transaction detected, transaction confirmed, etc.); or otherwise used.

In some variations, the front end module 112 generates one or more payment destinations (e.g., by using a digital wallet 113, key generation module 114, etc.), and sends information identifying the generated payment destinations to the platform 105. In a first example, the front end module can send the information identifying the payment destinations via a network by using an API of the platform 105. In a second example, the information identifying the payment destinations can be stored on a storage device, and the platform can load the information from the storage device. In a third example, a human operator can manually enter the information identifying the payment destinations via a user interface of the platform. However, platform can receive the information identifying the payment destinations in any suitable manner.

In a first variation, the front end module generates an extended public key, the platform receives the extended public key, and the platform uses the extended public key to generate new payment destinations when needed (e.g., when requested to do so by the front end module). The new payment destinations can then be sent to the front end module for use (e.g., in an invoice).

In a second variation, the front end module generates a payment destination for each transaction, and the platform receives each payment destination from the front end module. The platform can receive each payment destinations when needed to generate a payment transaction; alternatively, the platform can receive (and store) one or more payment destinations before generating payment transactions, and use a stored payment destination when generating a new payment transaction.

The front end module can be a single-user module that generates information identifying the payment destinations for a single user (e.g., a merchant, service provider, or a multi-user module that generates information identifying payment destinations for a plurality of users (e.g., merchants, service providers, etc.).

In some variations, when the front end module 112 generates one or more payment destinations, the front end module also generates corresponding private keys (or seeds or passphrases). In a first variation, the front end module 112 secures each generated private key (or passphrase) from systems external to the front end module (e.g., the platform). For example, the front end module can generate a private key, control a user interface (e.g., 117) displayed by the client device executing the front end module to display the private key, and then delete the private key from memory (and storage) of the client device after display of the private key (e.g., after a user has had an opportunity to memorize, write down, or otherwise preserve the private key). During processing of a withdrawal request, the front end module can request a user-provided private key via a user interface (e.g., 117). In a second variation, the front end module 112 provides at least one generated private key (or seed or passphrase) to an external module or system (e.g., client system 150) in a secure manner, such that the platform does not gain access to the private key. In this manner, the external module or system can provide the private key to the front end module during processing of a withdrawal request. In a third variation, the front end module 112 stores at least one generated private key (or seed or passphrase) in a secure manner (e.g., in a private key storage 119), such that only the front end module has access to the private key. In this manner, the front end module can process a withdrawal request without requesting a user-provided private key.

In some variations, the front end module 112 generates one private key (or seed or passphrase) that can be used to sign transactions sending funds from any payment destination used by the platform for the user. For example, the front end module can use an HD wallet to generate an extended public key and corresponding private key, provide the extended public key to the platform, the platform can use the extended public key to generate payment destinations, and the private key can be used to transfer funds from any payment destination generated by using the extended public key.

In one example, a user sends a charge request (e.g., S403 shown in FIG. 6) to the platform to charge a customer or to initiate payment, possibly with authentication information, e.g., an application programming interface (API) token issued to the user. The platform generates (or determines) a payment destination (e.g., S404 shown in FIG. 6), such as a payment address based on the public key associated with the user (recipient address), possibly after authentication of the user (e.g., based on the API token, based on a passphrase, etc.). The platform can generate and send payment information (e.g., S405 shown in FIG. 6) to the user or to a specified payor system (e.g., 401 shown in FIG. 6). In a specific example, the payment information can include the generated payment destination and the invoice information (e.g., charge amount). In some embodiments, the payment information can be: the payment information only; a website with the payment information (e.g., wherein the website enables payor payment of the charge); an in-application page (e.g., that enables payor payment of the charge); or can be in any other suitable form factor. The platform can optionally subsequently monitor (e.g., S407 shown in FIG. 6) the respective cryptocurrency network for which the payment destination was generated to determine whether a verified transaction to the payment destination was verified on the cryptocurrency network (e.g., wherein the payment destination can be used as a unique charge identifier). The platform can optionally verify other charge information, such as a charge amount. The platform can optionally store the payment destination in association with a user account associated with the user (e.g., S100 shown in FIG. 6). This can occur upon confirmation that a verified transaction sent to the payment destination appears on the CCN, upon payment destination generation, or at any other suitable time. The platform can optionally reuse the payment destination, blacklist the payment destination, or otherwise manage the payment destination upon expiration of the charge. For example, an expiration may result from receipt of a charge cancellation from the user, or determination that no verified transactions to the payment destination have occurred within a predetermined amount of time.

In some embodiments, the payment unit information is stored in association with a user account (e.g., in a user ledger). In embodiments, a public key (e.g., a master public key for the user, for the platform, etc.) paired with the user's private key can be stored in association with the user account.

In some embodiments, the payment unit information identifies payment destinations used for payment transactions to the user.

In some embodiments, the payment unit information identifies payment representations resulting from payment transactions to the user.

In some embodiments, the payment unit information identifies unspent transaction outputs (UTXOs) resulting from payment transactions to the user.

In some embodiments, the payment unit information identifies payment amounts of each payment transaction to the user.

In some embodiments, the platform updates the payment unit information for the user (e.g., the user ledger) after completion of each payment transaction for the user. The platform can optionally store a state for each payment unit information (e.g., "spent," "available," "pending," etc.), wherein the states can be subsequently used for payment unit or payment representation selection.

In some variations, the payment transactions related to the payment unit information are payment transactions to a payment destination of a user (e.g., recipient address). In a first example, the payment destinations are generated by the platform (e.g., by using an extended public key). In a second example the payment destinations are generated by the user device. The payment transactions can be processed by the platform 105, a payor system 401, or any suitable type of system that can generate payment transactions and broadcast the payment transactions to a corresponding cryptocurrency network.

In some variations the payment unit information is information stored by the platform 105 in response to detecting that a payment transaction to a payment destination of the user is verified by the cryptocurrency network (e.g., S407 shown in FIG. 6).

In some embodiments, S100 includes determining the user's balance for at least one cryptocurrency network across all payment destinations associated with the user. S100 can optionally include the platform 105 providing information identifying the determined user's balance to the user device. The user's balance can be determined after completion of a payment transaction for the user for the cryptocurrency network, in response to a request to determine the balance, or at any suitable time. The platform can provide the user's balance to the user device at any time, such as in connection with a withdrawal request, or in response to any other suitable request or trigger.

In a first variation, the platform 105 determines the user's balance by using the payment unit information stored by the platform 105 for the user (e.g., in the user ledger). In some implementations, the platform receives a balance request for at least one cryptocurrency network from the user device, and sends the determined user's balance to the user's device as a response to the request. For example, the user device can provide the platform 105 with an extended public key, and the platform can generate payment destinations by using the extended public key, and store information associating each payment destination generated for the user with a user identifier. Rather than requiring the user device to identify all payment destinations, and calculate a balance for the cryptocurrency network across all payment destinations (which can, in some cases, be quite large, such as in the case where the user is a large e-commerce platform), the platform 105 can determine the balance by using payment unit information created by the platform for each payment transaction.

In a second variation, the user device determines the user's balance. In a first example, the user device records all payment destinations generated by the user device, and determines the balance by accessing the cryptocurrency network to obtain balances for each payment destination and totaling all of the balances. In a second example, the user device requests from the platform 105 information identifying all payment destinations generated by the platform 105 for the user, and determines the balance by accessing the cryptocurrency network to obtain balances for each payment destination and totaling all of the balances. In a third example, the user device records a number of payment transactions processed by the platform 105 on behalf of the user (e.g., tracks all payment requests sent to the platform, tracks all sales using a cryptocurrency supported by the network whose balance is to be determined, etc.), uses a public key (e.g., an extended public key sent to the platform 105 to generate payment destinations) to derive a number of payment destinations that equals the number of payment transactions, and determines the balance by accessing the cryptocurrency network to obtain balances for each derived payment destination and totaling all of the balances.

S200 operates to receive a withdrawal request from a user device. S200 functions to initiate the withdrawal process (e.g., at the platform 105). The withdrawal request can be received by the front end module, the user device, a third party integrating the front end module, the platform, or by any other suitable component. The withdrawal request can be received from a user, automated withdrawal system, or other source. In some embodiments, the withdrawal request is received from a user device (e.g., executing a front end module 112) of a user of the cryptocurrency platform (e.g., 105). In one example, the user is a merchant transacting goods or services. In another example, the user has received a plurality of payments (e.g., at S406 shown in FIG. 6) from other users, and payments have been sent to multiple different payment destinations owned by the user. In some embodiments, the user has been authenticated (e.g., to the platform 105) in a secure or sandboxed way. In some embodiments, the withdrawal request is received at platform 105. In some embodiments, the withdrawal request includes at least one of a withdrawal amount, a withdrawal destination, a fee amount, cryptocurrency network, a merchant identifier or merchant account identifier, a verification token such as an API token, or other pieces of data.

In some embodiments, the fee amount specifies an amount (or limit) of fee the user is willing to pay for processing the withdrawal transaction (e.g., a miner fee). The fee can be a number, a range, or a description (e.g., "high", "medium", "low").

The withdrawal destination can be generated from the public key used to generate the recipient and/or consolidation addresses, from the private key, a different public key, or a different private key. In a first variation, the withdrawal destination is a cryptocurrency address (e.g., defined by a cryptocurrency protocol). In a second variation, the withdrawal destination is a cryptocurrency account (e.g., defined by a cryptocurrency protocol). In some variations, the withdrawal destination is a bech 32 address. In some variations, the withdrawal destination is a segwit address.

In some embodiments, the withdrawal request includes a single requested withdrawal destination to send the withdrawal to (and a single withdrawal amount), but can alternatively include multiple destinations (and optionally a withdrawal amount for each destination).

The withdrawal request can be for one or more cryptocurrency networks. In a first variation, the withdrawal request is a request to withdraw funds for the user for a single cryptocurrency network. The single-network withdrawal request can identify the cryptocurrency network. Alternatively, the cryptocurrency network can be identified based on a withdrawal destination identified by the withdrawal request. In a second variation, the withdrawal request is a request to withdraw funds for the user for a plurality of cryptocurrency networks. In a first example, a multi-network withdrawal request can identify each cryptocurrency network. In a second example, each network can be identified based on a withdrawal destination identified by the withdrawal request. In some variations, a multi-network withdrawal request can identify a withdrawal destination for each cryptocurrency network, and a withdrawal amount for each cryptocurrency network.

In some embodiments, if a withdrawal destination is not owned by the user (e.g., as determined based on the stored extended public key, etc.), the withdrawal request is canceled (e.g., by the platform, by the front end module, etc.).

In some embodiments, the withdrawal request is signed with the user's private key (e.g., a private key generated by a front end module 112 running on the user's device), wherein the platform verifies the signature before proceeding to S300. In some embodiments, the withdrawal request can be generated by a front end module (e.g. 112).

In a first variation, S200 includes the platform 105 receiving (from the user device) a front end module request (e.g., via HTTP, or any suitable type of communication protocol) to receive the front end module 112 from the platform 105. In response to the front end module request, the platform 105 sends the front end module 112 to the user device (e.g., via HTTP, or any suitable type of communication protocol). In response to receiving the front end module 112, the user device executes the front end module 112, which generates the withdrawal request. In a second variation, the user device receives the front end module prior to the withdrawal request (e.g., during registration at the platform 105) from either the platform 105 or an external storage location (e.g., an app store).

A withdrawal module 116 included in the front end module 112 can generate the withdrawal request. However, any suitable component (or combination of components) of the front end system 112 can generate the withdrawal request. In some embodiments, the withdrawal request can be generated by another computing device other than the user device.

In a first variation, the front end module initiates the withdrawal request responsive to user input received via a user interface (e.g., 117) of the front end module.

In a second variation, the front end module initiates the withdrawal request responsive to a request received (e.g., from a client system) via a client-API (e.g., 118) of the front end module.

S300 operates to select payment representations to satisfy the withdrawal request S300. In some embodiments, S300 functions to select multiple payment representations from various payment destinations associated with user, such that the selected payment representations cooperatively sum up to at least the requested withdrawal amount (e.g., withdrawal amount plus fees, e.g., slightly exceed it). S300 can be performed in response to S200, after S350, upon verification that the user's balance exceeds the withdrawal amount (e.g., with or without fees), or at any other suitable time. In some embodiments, S300 can be performed by the platform, the front end module, and/or other component. In some embodiments, payment representations can be a representation of payment, such as a payment destination for the user. In a first example, payment representations include UTXO's. In a second example, payment representations include cryptocurrency addresses. In a third example, payment representations include cryptocurrency accounts. However, any suitable form of payment representation can be used.

In some variations, payment representations satisfying predetermined withdrawal amounts are pre-selected and information identifying the selected payment representations and the corresponding withdrawal amounts are stored by the platform 105. For example, the platform 105 can pre-select payment representations used to satisfy common withdrawal amounts (e.g., $1000, $10,000, $100,000, etc.). In a first variation, the platform determines the withdrawal amounts used for pre-selection of payment representations.

In a second variation, the user configures common withdrawal amounts, and the platform pre-selects payment representations that match the common withdrawal amounts configured by the user. In a third variation, the platform records a history of the user's past withdrawal amounts, and uses the recorded withdrawal history to determine withdrawal amounts for which pre-selection of payment representations is to be performed.

In some embodiments, the payment representations are selected based on optimized matching for the withdrawal amount (e.g., equaling the amount, slightly exceeding the amount, etc.). In some embodiments, the selection is based on a greedy approach (such as picking the payment representation that has the smallest balance, among payment representations of the user that match or exceed the withdrawal amount). In some embodiments, the payment representations are selected to minimize fees. In some embodiments, the payment representations are selected according to a predetermined set of rules or heuristics, randomly selected, selected up to a predetermined payment representation number limit, or otherwise selected. However, payment representations can be otherwise selected.

In some embodiments, selecting payment representations can include satisfying a target amount based on the respective value. For example, the target amount may be the withdrawal amount, or alternatively, the withdrawal amount plus transaction and/or broadcasting fees.

The method can optionally include locking or freezing use of the selected payment representations until transaction confirmation. For example, the platform (or other payment representation selection module) can change the state of the selected payment representations to "pending" or "used." In a second example, the platform can freeze all further withdrawals until the current withdrawal is complete (e.g., enforce one withdrawal at a time). However, multiple use of selected payment representations can be otherwise managed.

Optional S350 operates to calculate estimated transaction and/or broadcasting fees for the unsigned transactions (to be generated at S400). S350 can be performed by any suitable component of the platform 105. S350 can be performed before S300, in response to S200, or at any other suitable time. In some implementations, the front end module can perform at least a portion of S350. In some embodiments, S350 functions to calculate any fees to be paid by the user or merchant.

In some implementations, the platform compares the calculated fees to a fee amount included in the withdrawal request. If the calculated fee exceeds the fee amount in the withdrawal request, then the withdrawal is canceled. Otherwise, the platform continues with withdrawal process (e.g., by select payment representations, generating a withdrawal transaction, etc.).

In a first variation, the fees are deducted from the withdrawal amount. In a second variation, the fees are added to the withdrawal amount, and the payment representations are selected at S300 to satisfy the sum of the withdrawal amount and the fees. The transaction fees and/or broadcasting fees may include miner's fees or gas prices for transactions, differences from price spreads or price fluctuations on transactions, or any other transaction fees or broadcasting fees a payment platform may charge for transactions. In some embodiments, S350 uses one or more libraries and/or pre-calculated values which show that an assigned portion will cost a certain amount in transaction or broadcasting fees.

The method can optionally include determining a consolidation address, which functions as an intermediary, temporary recipient for the payment representations before transfer to the destination address. The consolidation address can be determined in response to S200, in response to user withdrawal confirmation (e.g., fee confirmation), before S200, and/or at another time. The consolidation address can be generated by the platform, the front end module, or other component. In some variations, the consolidation address is under direct ownership of the user, and the user controls keys used for signing transactions for transfers from the consolidation address. In some variations, the consolidation address is associated with the user. In some variations, the consolidation address is associated with the platform. However, in some variations, the consolidation address can be associated with any suitable entity. The consolidation address is preferably generated from the private key associated with the user (e.g., such that transactions with the consolidation address as an input can be signed by the user's private key), but can additionally or alternatively be a platform address associated with the platform (e.g., generated from a public key associated with the platform), be a predetermined address (e.g., platform hot wallet address), or any other suitable address. The consolidation address is preferably a one-time address, but can additionally or alternatively be a multiuse address, a previous recipient address (e.g., for account/balance protocols), or any other suitable address.

In some embodiments, the method can include determining a set of unsigned withdrawal transactions, which function to generate unsigned cryptocurrency transactions that transfer payment units to the destination address once signed. In some implementations, the withdrawal transactions are preferably generated according to the cryptocurrency protocol of the withdrawal request and/or payment representation, but can be otherwise generated. The withdrawal transactions are preferably generated using the selected payment representations (e.g., recipient addresses), the destination address, the consolidation address, and/or other data.

In some embodiments, withdrawal transactions can include one or more: destination transactions, consolidation transactions, fee transactions, and/or other cryptographic transaction. Destination transactions can send payment units from at least one payment destination (e.g., receiving address) to the destination address; from a consolidation address to the destination address; or from another input to the destination address. Consolidation transactions can send payment units from at least one payment destination (e.g., receiving address) to the consolidation address; or from another input to the consolidation address. Fee transactions can send payment units from at least one payment destination (e.g., receiving address) or consolidation address to a fee address associated with the platform (e.g., platform hot wallet address, platform fee address).

The transactions can include one or more inputs (e.g., the selected payment representations) and one or more outputs (e.g., consolidation address, destination address, change address, etc.). In one example, one consolidation or destination transaction is generated for each payment representation. In a second example, one consolidation or destination transaction is generated for multiple payment representations.

Figure 8:
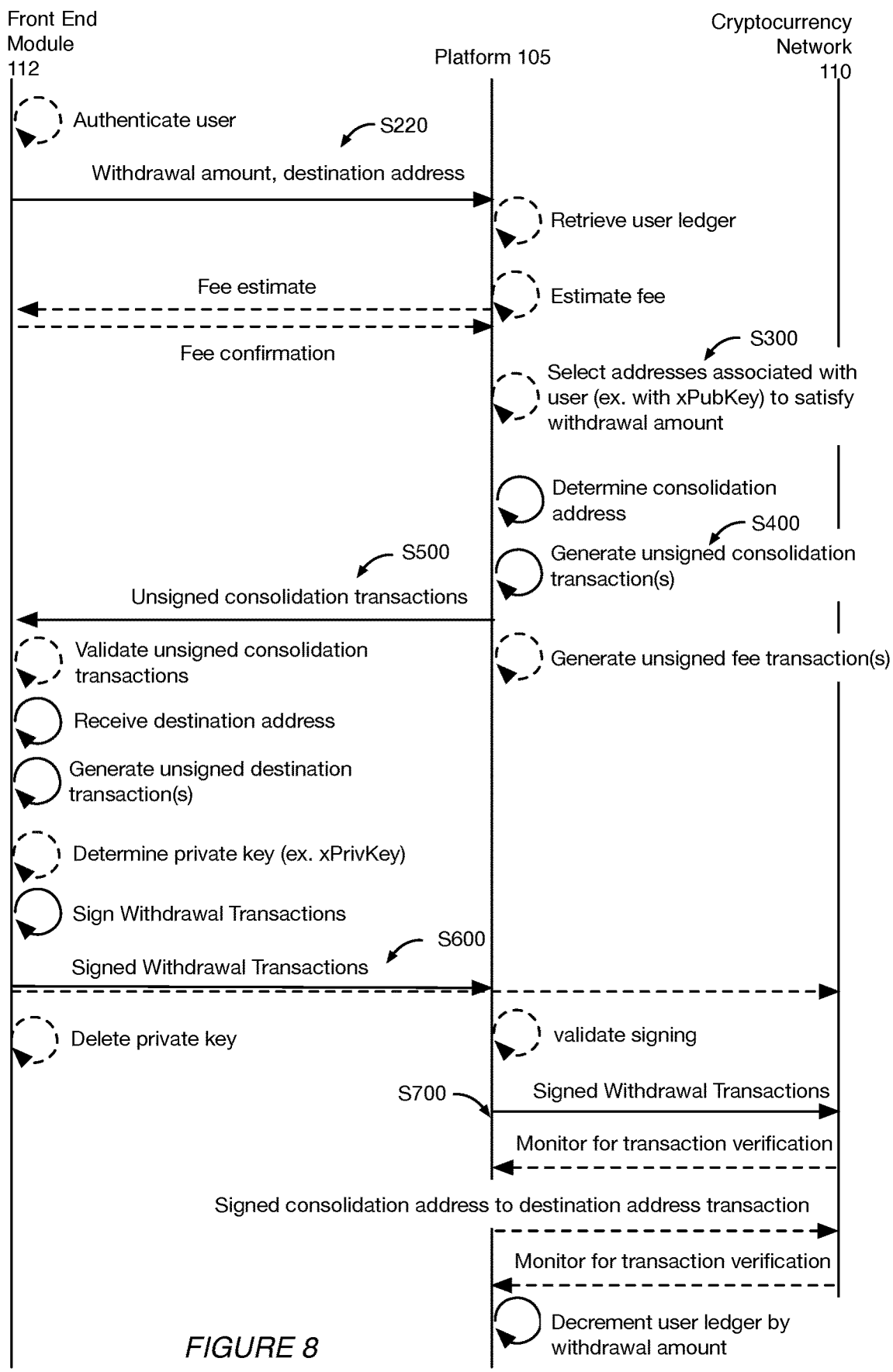

All or some of the withdrawal transactions can be performed by the platform, front end module, and/or other component. In one example, the platform generates both the consolidation transaction(s) and destination transaction, example shown in 7. In a second example, the platform generates the consolidation transaction and the front end module generates the destination transaction (e.g., upon consolidation address or transaction receipt from the platform, consolidation transaction verification, etc.), example shown in FIG. 8. However, the transactions can be otherwise generated.

Determining the set of withdrawal transactions can include or exclude S370, S400, and/or other processes.

Optional S370 includes determining one or more consolidation transactions, where each consolidation transaction includes multiple payment representations. S370 can be performed by any suitable component of the platform 105. In some implementations, the front end module can perform at least a portion of S370.

In some variations, S370 functions to perform consolidation by performing a multi-stage branched process. Such a multi-stage branched process may be used in instances when a particular cryptocurrency protocol allows for a single transaction with multiple payment representations as inputs. For example, there may be a single withdrawal transaction which includes inputs of payment representations from multiple sources, and which sends payment representations to multiple sources. This allows users to have a single withdrawal transaction (e.g., which can result in minimized transaction fees) where all of the payment representations intended to go out to different addresses can be contained in a single transaction and can be sent to a single withdrawal destination. Cryptocurrencies often have particular transaction size considerations, however, such that a payment platform cannot generate arbitrarily large transactions to "sweep" all of a set of funds. In some implementations, "Sweeping" refers to a process whereby when a user wishes to withdraw, based on the payment representations and amounts in each payment representations, the payment platform, e.g.: determines which are the right set of payment representations to aggregate for the withdrawal transaction; sends them to a sandbox which includes a hash function; uses the hash function with the payment representations generated from the user's public key to derive the cryptographically linked private key; signs the withdrawal transaction with the private key; and broadcasts the signed withdrawal transaction for inclusion in the blockchain. In such a "sweep" of the funds, if there are too many funds pulled from too many payment representations, the withdrawal transaction may be rejected by the blockchain on the CCN operating through the cryptocurrency protocol.

In such instances or embodiments, a branched process can be used to consolidate the payment representations in a manner that resembles a tree-like branching structure. The multi-stage, branched, tree-like process may be used in some embodiments to resolve this issue of size. In some embodiments, a selected multi-payment withdrawal transaction (including, e.g., several payment representations) is split into two or more auxiliary withdrawal transactions. Subsets of these payment representations are then generated for each of these auxiliary withdrawal transactions. The "sweep" process then iterates through S400 through S700 of this method for each auxiliary withdrawal transaction.

In a first variation, each of auxiliary withdrawal transaction includes a same withdrawal destination.

In a second variation, at least two of the auxiliary withdrawal transactions include different withdrawal destinations. In some implementations, each withdrawal destination is provided by the withdrawal request. In some implementations, responsive to a determination by the platform 105 that several auxiliary withdrawal transactions are to be generated, the platform sends a request to the front end module allowing the front end module to identify additional withdrawal destinations, or allow all auxiliary withdrawal transactions to use the same withdrawal destination (e.g., a withdrawal destination). Alternatively, the platform can generate auxiliary withdrawal destinations for each auxiliary transaction (e.g., by using an extended public key), and generate further auxiliary withdrawal transactions to transfer funds from the auxiliary withdrawal destinations to the withdrawal destination identified in the withdrawal request; each auxiliary transaction can be sent to the front end module at the same time such that the front end module can sign all auxiliary withdrawal transactions in a single signing process.

S400 operates to generate an unsigned transaction based on the selected payment representations. S400 can be performed by any suitable component of the platform 105. In some implementations, the front end module can perform at least a portion of S400. S400 functions to package the selected payment representations together and consolidate them into a single unsigned withdrawal transaction. The unsigned withdrawal transactions are generated according, at least in part, to the cryptocurrency protocol for the cryptographic currency being withdrawn or transferred. A generated withdrawal transaction includes at least the selected payment representations and the withdrawal destination. In some embodiments, the generated withdrawal transaction can include individual amounts of the payment representations, a summed amount of the payment representations, an IP address of the user (or system) requesting the withdrawal, fee limits (e.g., identified in the withdrawal request) associated with the transaction, and/or any other information relevant to a transaction.

Figure 3:
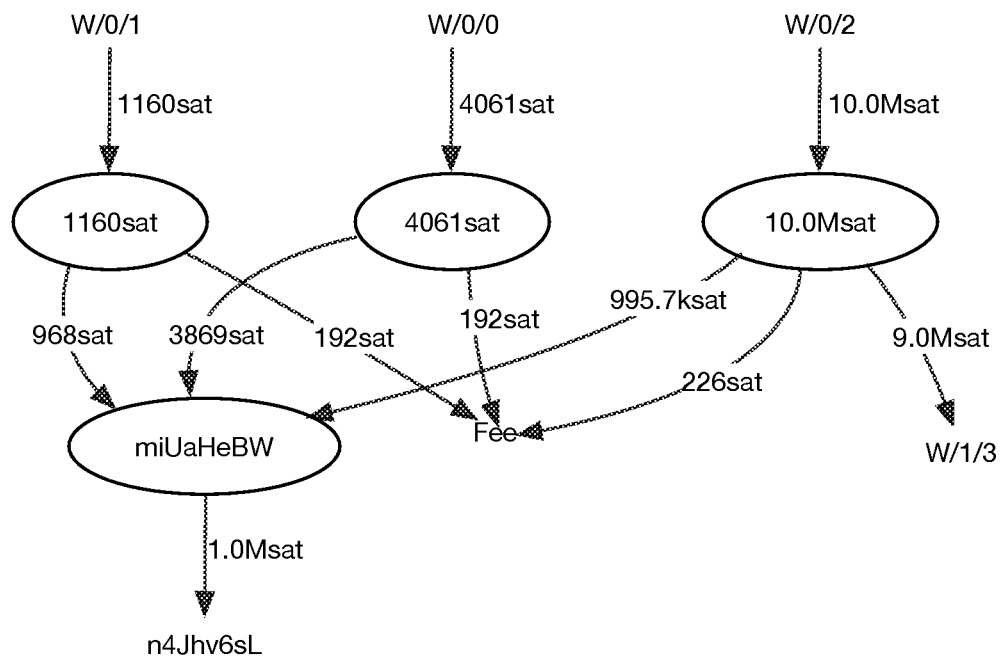
FIG. 3 is an illustration of an example of withdrawal consolidation according to one of the embodiments.

FIG. 3 illustrates an example embodiment of the withdrawal consolidation process. Three different selected unsigned withdrawal transactions, each transaction containing multiple payment representations, are represented as 1160sat, 4061sat, and 10.0Msat. The payment representations of the three transactions are all inputs to a single generated withdrawal transaction, represented as miUa-HeBW. A single withdrawal destination, 1.0Msat, is the specific destination for this generated transaction. A single output payment representation n4Jhv6sL which is the sum of the individual payment representation inputs is contained in the withdrawal transaction, to be output to the withdrawal destination.

S500 operates to send the unsigned withdrawal transaction(s) to the user device. S500 functions to send the withdrawal transactions to the user device for signature, and optional verification (e.g., S550). In a preferred embodiment, the unsigned withdrawal transactions are transmitted off-chain, e.g., the transactions are sent to the user device outside of the blockchain. Alternatively, the unsigned withdrawal transactions are transmitted on-chain. In some embodiments, the front end module 112 is used to digitally sign the withdrawal transactions. In some embodiments, the front end module 112 is a signing enclave. In some embodiments, the front end module 112 includes a signing enclave. In some embodiments, the signing module 115 is a signing enclave. In some embodiments, the signing enclave (e.g., signing module) is an environment where transactions are signed (e.g., using the user's private key). In some embodiments, the signing enclave further generates and/or stores private keys. The signing enclave can be a component in a user interface, a component in an iFrame on a custom subdomain, a browser extension, a mobile application, a user device, or other device, application, or component. In some embodiments, a user interface is presented to the user containing, e.g., dashboards, balances, etc. In some variations, the signing enclave is controlled by one of an accounting system, a billing system, a point of sale system, and an e-commerce system. However, in some variations, the signing enclave can be otherwise controlled.

In some embodiments, the digital signature process (e.g., performed by the signing module 115) for transactions is a cryptographic process involving a public-private key pair.

Alternatively, the signed transactions are presented to the user for offline verification.

In some embodiments, the front end module 112 signs the unsigned withdrawal transaction (e.g., by using the signing module) by using a private key (or seed or passphrase).

In a first variation, the front end module receives a user-provided private key (or seed or passphrase) via a user interface (e.g., 117). In a second variation, the front end module 112 receives the private key (or seed or passphrase) from an external module or system (e.g., client system 150) (e.g., via the client-API 118). In a third variation, the front end module 112 retrieves the private key (or seed or passphrase) from a secure private key storage (e.g., 119).

In some embodiments, S500 can optionally include verifying the unsigned withdrawal transaction (e.g., S550). This preferably occurs before transactions are signed, but can be performed at any other suitable time. S550 is preferably performed by the signing enclave (e.g., the front end module 112), but can alternatively be performed by any other suitable system. In some embodiments, the verification is performed by one or more of a browser, wallet, alternate platform, sandbox, and/or other device or software capable of verifying transactions. In some embodiments, the verification includes verifying payment destinations (e.g., selected payment representations, selected recipient addresses), withdrawal amount (e.g., requested withdrawal amount, fees, etc.), metadata, and/or any other suitable unique information (or combination thereof) associated with a withdrawal transaction. In some embodiments, the method verifies that the withdrawal amount mirrors the amounts of all the individual packaged payment representations when summed. In some embodiments, the platform 105 rejects the withdrawal request if any payment representation (or payment destination) is incorrect or not supposed to be included, the signing doesn't appear reasonable or causes one or more verification flags to be raised, or some verification condition otherwise fails to be satisfied. In some embodiments, the payment representations can be re-derived from the user's private key, and the method verifies that the payment representations (e.g., within the unsigned withdrawal transaction) matches the payment destinations that could be derived from the user's private keys and/or could be derived from the user's private key.

In a first variation, S500 includes, at the front end module: receiving one or more unsigned consolidation transactions from the platform; optionally verifying the unsigned consolidation transactions; generating a destination transaction (e.g., based on the consolidation address extracted from the consolidation transactions, based on the destination address) (e.g., upon verification); and signing the destination transaction and the consolidation transactions (e.g., upon verification, concurrently or individually). In a second variation, S500 includes, at the front end module: receiving an unsigned destination transaction and one or more unsigned consolidation transactions from the platform; optionally verifying the unsigned transactions; and signing the destination and consolidation transactions (e.g., upon verification, concurrently or individually). In a third variation, S500 includes, at the front end module: receiving a signed destination transaction and one or more unsigned consolidation transactions from the platform (e.g., wherein the consolidation address is a platform address); optionally verifying the unsigned transactions; and signing the consolidation transactions (e.g., upon verification, concurrently or individually). In a fourth variation, S500 includes, at the front end module: receiving one or more unsigned destination transactions from the platform; optionally verifying the unsigned transactions; and signing the consolidation transactions (e.g., upon verification, concurrently or individually). However, the transactions can be otherwise generated and signed.

S600 operates to receive signed withdrawal transactions. S600 functions to receive one or more of the signed withdrawal transactions (e.g., signed with the user's private keys). In some embodiments, the signed withdrawal transactions are received from a user device, browser, wallet, or other device or application. In some embodiments, the signed transactions are received from a front end module (e.g., 112) running on a user device. The signed withdrawal transaction is preferably received by the platform, but can be received by the respective CCN or any other suitable system. In a preferred embodiment, the signed withdrawal transactions are received off chain. Alternatively, the signed withdrawal transactions are received on-chain (e.g., wherein the front end module publishes the signed transactions to the respective CCN). The receiving system (e.g., platform) can optionally verify the signed transactions (e.g., verify the signature, verify the addresses, etc.) before S700. In some embodiments, the withdrawal transaction automatically expires after a predetermined amount of time. For example, a withdrawal transaction might expire after a set time of two weeks has passed. In some embodiments, a withdrawal transaction expiring can mean, e.g., a wallet is precluded from signing the withdrawal transaction, or a signed withdrawal transaction isn't sent to the cryptocurrency network.

S700 operates to send the signed withdrawal transactions to the cryptocurrency network. S700 functions to transmit the signed withdrawal transaction to the cryptocurrency network for validation prior to being added as a block to the blockchain. In variants, the signed withdrawal transaction can be sent using a blockchain node maintained by the platform 105. In some embodiments, sending is performed to follow valid, secure broadcasting methods. In some embodiments, such broadcasting methods are specified by the cryptocurrency network. The signed transactions can be published (e.g., broadcast): serially, as a batched transaction, as an atomic transaction, as a child pays for parent transaction (CPFP transaction), or as another transaction type. The signed consolidation transactions are preferably broadcast before signed destination transaction broadcast (e.g., wherein the signed destination transaction is a child of the signed consolidation transactions), but can be broadcast concurrently, together, or in any other suitable order. When the signed transactions are serially published, verification of preceding transactions (e.g., the consolidation transactions) can be confirmed before sending successive transactions (e.g., the destination transactions), but the successive transactions can alternatively be sent at any time.

The method can optionally include monitoring the cryptocurrency network for verification of the withdrawal transactions, which function to determine that the withdrawal, or portion thereof, is completed. This can be performed similar to S407, wherein the consolidation address and/or destination address is monitored instead of the recipient address, but can be otherwise performed. Similarly to above, the user ledger can optionally be updated with the withdrawal amount after transaction validation (e.g., decremented by the withdrawal amount, withdrawal amount with fees, amount extracted from the validated transactions, etc.). The method can optionally include changing the state of the selected payment representations to "used" or "unavailable."

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising: with a non-custodial cryptocurrency platform:
receiving an extended public key from a client device via a network;
receiving a withdrawal request from the client device, the withdrawal request identifying a withdrawal amount and a withdrawal destination;
selecting payment representations to satisfy the withdrawal request, by using payment unit information stored by the platform for a user of the client device;
in response to the withdrawal request, using the extended public key received from the client device to generate a consolidation address that is under direct ownership of the user, wherein the platform does not store a private key for the consolidation address;
generating at least one unsigned consolidation transaction that identifies at least one selected payment representation as an input and the generated consolidation address as an output;
generating an unsigned destination transaction that identifies the generated consolidation address as an input and the withdrawal destination as an output;
sending, via the network, the unsigned destination transaction and each unsigned consolidation transaction to a signing enclave included in the client device, wherein the signing enclave stores the private key for the consolidation address;
receiving from the signing enclave via the network:
a signed destination transaction for the unsigned destination transaction sent to the signing enclave, wherein the signed destination transaction includes a signature generated by using the private key for the consolidation address, and
a signed consolidation transaction for each unsigned consolidation transaction sent to the signing enclave; and
sending the signed destination transaction and each signed consolidation transaction to a cryptocurrency network.

2. The method of claim 1, wherein the withdrawal destination is a cryptocurrency address, and wherein the payment representations are unspent transaction outputs.

3. The method of claim 1, wherein the withdrawal destination is a cryptocurrency account, and wherein the payment representations are cryptocurrency accounts.

4. The method of claim 1, wherein the stored payment unit information identifies payment destinations used for payment transactions to the user.

5. The method of claim 1, wherein the platform receives the withdrawal request via an HTTP (Hypertext Transfer Protocol) application programming interface (API) of the platform, and provides each unsigned transaction to the signing enclave included via HTTP.

6. The method of claim 5, further comprising: the platform sending machine-executable instructions of the signing enclave to the client device via HTTP.

7. The method of claim 6, wherein sending the machine-executable instructions of the signing enclave to the client device comprises: sending machine-executable instructions of a front end module to the client device, wherein the machine-executable instructions of the front end module include the machine-executable instructions of the signing enclave and machine-executable instructions of a Hierarchical Deterministic (HD) digital wallet.

8. The method of claim 1, wherein selecting payment representations to satisfy the withdrawal request comprises:
calculating estimated fees for the withdrawal request; and
selecting payment representations whose combined amounts are greater than or equal to a sum of the withdrawal amount and the estimated fees.

9. The method of claim 1, further comprising:
the signing enclave verifying each unsigned transaction; and
the signing enclave signing each verified unsigned transaction.

10. The method of claim 1, wherein the signing enclave is controlled by one of an accounting system, a billing system, a point of sale system, and an e-commerce system.

11. The method of claim 1,
further comprising: with the platform: storing payment unit information for the user.

12. The method of claim 11, further comprising: with the platform:
receiving a charge request from a payor system, wherein the charge request is a request to pay the user on behalf of a payor;
in response to the charge request:
determining a payment destination for the user, and
sending information identifying the payment destination to the payor system;
monitoring for verification of a payment transaction to the payment destination;
in response to verification of the payment transaction to the payment destination, updating the stored payment unit information for the user to include information identifying the payment destination used for the payment transaction.

13. The method of claim 12, wherein determining a payment destination for the user, with the platform, in response to the charge request comprises: receiving information identifying the payment destination from the client device.

14. The method of claim 12, wherein determining a payment destination for the user, with the platform, in response to the charge request comprises: generating a payment address by using an extended public key received from the client device.

15. The method of claim 14,
wherein the platform uses the extended public key to generate a new payment destination for the user for each charge request for payment to the user,
wherein the payment unit information identifies the payment destination for each charge request for payment to the user.

16. The method of claim 15, wherein each charge request is a request for payment to the user using the cryptocurrency network.

17. The method of claim 14, further comprising: with the platform;
generating a total balance for the user for charge requests for the cryptocurrency network by using the stored payment unit information; and
providing the generated total balance to the client device.

* * * * *